(12) United States Patent
Johns et al.

(10) Patent No.: US 8,647,125 B2
(45) Date of Patent: Feb. 11, 2014

(54) APPARATUSES AND METHODS FOR SIMULATING MICROLARYNGEAL SURGERY

(75) Inventors: Michael M Johns, Atlanta, GA (US); Adam M. Klein, Atlanta, GA (US)

(73) Assignee: Emory University, Atlanta, GA (US)

( * ) Notice: Subject to any disclaimer, the term of this patent is extended or adjusted under 35 U.S.C. 154(b) by 1447 days.

(21) Appl. No.: 12/057,653

(22) Filed: Mar. 28, 2008

(65) Prior Publication Data

US 2008/0241807 A1 Oct. 2, 2008

Related U.S. Application Data

(60) Provisional application No. 60/920,911, filed on Mar. 30, 2007.

(51) Int. Cl.
*G09B 23/28* (2006.01)
(52) U.S. Cl.
USPC .......................................... 434/267; 434/272
(58) Field of Classification Search
USPC .......... 434/267, 269, 270, 272, 262, 295, 296
See application file for complete search history.

(56) References Cited

U.S. PATENT DOCUMENTS

| | | | | |
|---|---|---|---|---|
| 3,471,944 A * | 10/1969 | Breckwoldt | ................... | 434/270 |
| 3,704,529 A * | 12/1972 | Cioppa | ..................... | 434/272 |
| 3,874,093 A * | 4/1975 | Garbe | ............................ | 434/265 |
| 4,484,896 A * | 11/1984 | Kohnke | ......................... | 434/265 |
| 4,773,865 A * | 9/1988 | Baldwin | ........................ | 434/268 |
| 4,867,686 A * | 9/1989 | Goldstein | ..................... | 434/267 |
| 5,306,298 A * | 4/1994 | Godley et al. | ..................... | 623/9 |
| 5,823,787 A * | 10/1998 | Gonzalez et al. | ............. | 434/265 |
| 5,846,087 A * | 12/1998 | Scherer | ......................... | 434/270 |
| 5,997,307 A * | 12/1999 | LeJeune, Jr. | ................... | 434/262 |
| 6,908,309 B2 * | 6/2005 | Gil et al. | ........................ | 434/267 |
| 2004/0126746 A1 * | 7/2004 | Toly | ............................... | 434/262 |

* cited by examiner

*Primary Examiner* — Gene Kim
*Assistant Examiner* — Joseph B Baldori
(74) *Attorney, Agent, or Firm* — Thomas Horstemeyer, LLP

(57) ABSTRACT

Apparatus for simulating microlaryngeal surgery. In one embodiment, the apparatus includes a larynx model that emulates an actual larynx, the larynx model including an inner passage that includes a vocal fold model support that emulates a portion of an actual vocal fold, and a vocal fold model that emulates tissues of an actual vocal fold, the vocal fold model being adapted to be received by the vocal fold model support of the larynx model.

32 Claims, 4 Drawing Sheets

APPARATUSES AND METHODS FOR SIMULATING MICROLARYNGEAL SURGERY

CROSS-REFERENCE TO RELATED APPLICATION

This application claims the benefit of the filing date of U.S. Provisional Application Ser. No. 60/920,911 entitled "Microlaryngeal Surgery Simulation Apparatuses and Methods" and filed Mar. 30, 2007, which is hereby incorporated by reference in its entirety.

BACKGROUND

Microlaryngeal surgery is a term that refers to surgical procedures performed on the larynx and, most often, the vocal folds. Surgery performed on the vocal folds typically involves the dissection and/or manipulation of fragile tissue and therefore requires fine manual dexterity and instrument control. Unfortunately, no realistic model of the vocal folds exists on which inexperienced microlaryngeal surgeons can practice. As a result, many novice microlaryngeal surgeons are trained using cadaveric larynxes, which are difficult and expensive to obtain and which often do not comprise the various pathologies with which the surgeons must become familiar and comfortable operating on. Due to those factors, it is not uncommon for surgeons to receive much of their training while operating on living patients. Clearly, such a practice is less than ideal.

BRIEF DESCRIPTION OF THE DRAWINGS

The disclosed apparatuses and methods can be better understood with reference to the following drawings. The components in the drawings are not necessarily to scale.

DETAILED DESCRIPTION

As described above, microlaryngeal surgery requires fine manual dexterity and instrument control. Unfortunately, it is difficult for inexperienced microlaryngeal surgeons to practice microlaryngeal procedures given the limited availability and expense of cadaveric larynxes. Disclosed herein are models that emulate the conditions and anatomy encountered in microlaryngeal surgery and, more particularly, surgical procedures performed on the vocal folds. Using such models, novice microlaryngeal surgeons can develop their surgical skills before performing actual procedures on living patients. In some embodiments, the models include a larynx model that generally emulates the dimensions and constraints of the human larynx and disposable vocal fold models configured for use with the larynx model that realistically emulate both the dimensions and physical properties of healthy vocal folds.

Figure 1:
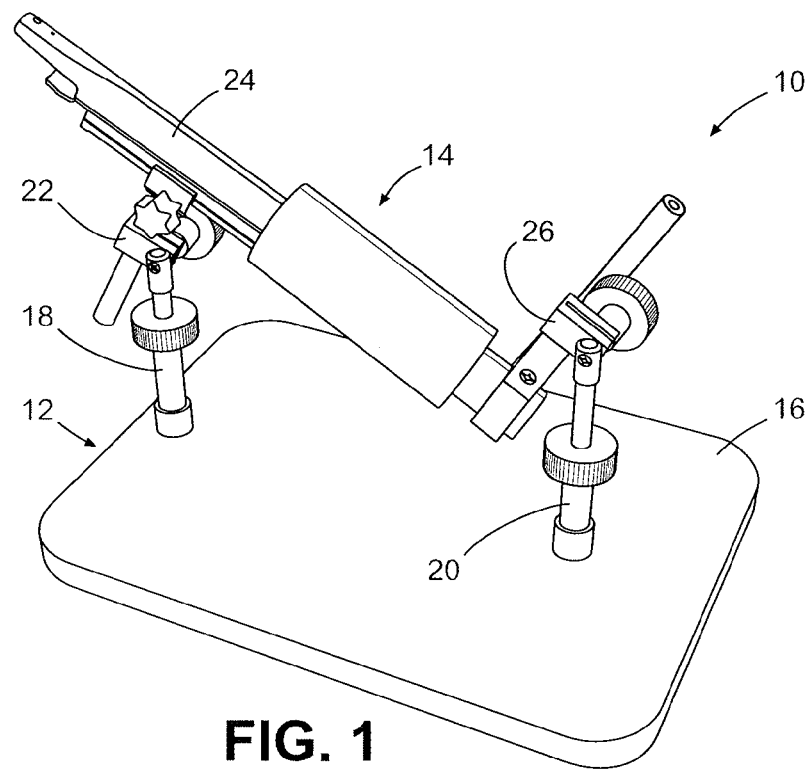
FIG. 1 is a perspective view of an embodiment of apparatus for simulating microlaryngeal surgery.

Turning to the figures, in which like numerals identify corresponding components, illustrated in FIG. 1 is an embodiment of apparatus 10 for simulating microlaryngeal surgery. The apparatus 10 generally includes a support stand 12 and a larynx model 14 that is supported by the stand. The support stand 12 comprises a base 16 from which a laryngoscope support 18 and a larynx model support 20 upwardly extend. The laryngoscope support 18 comprises an armature 22 that secures and supports a tube 24 that emulates an interior passage of a laryngoscope of the type typically used to perform microlaryngeal surgery. The larynx model support 20 comprises its own armature 26 that secures and supports the larynx model 14 in an orientation in which the internal "organs" (described below) of the larynx model can be accessed via the tube 24. Although a particular embodiment for the support stand 10 is illustrated in FIG. 1, it is noted that the specific attributes and configuration of the support stand is not critical to the instant disclosure. More important is that the support stand used, whatever its nature, is capable of supporting the tube 24 and the larynx model 14 in relative orientations that emulate those that would be encountered during microlaryngeal surgery.

Figure 2:
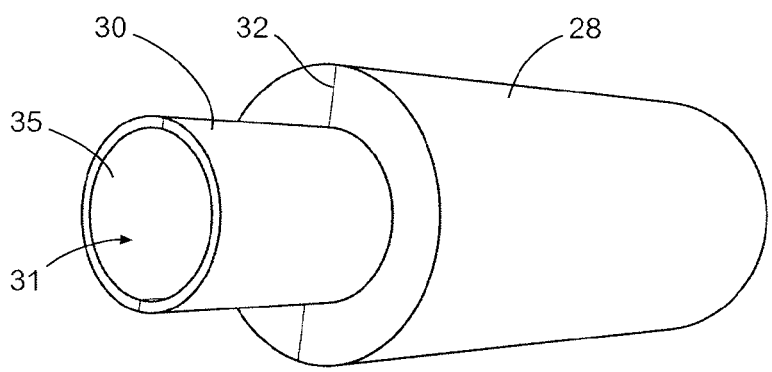
FIG. 2 is a first perspective view of a larynx model shown in FIG. 1.
Figure 3:
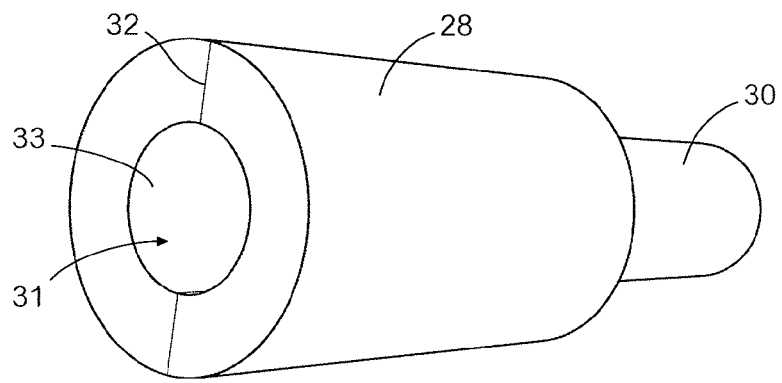
FIG. 3 is a second perspective view of the larynx model of FIG. 2.

Referring to FIGS. 2 and 3, the larynx model 14 is generally cylindrical and comprises a first or proximal portion 28 and a second or distal portion 30 that are connected to each other. In the illustrated embodiment, the proximal portion 28 has a first outer diameter and the distal portion has a second outer diameter that is smaller than the first diameter. With further reference to FIGS. 2 and 3, the larynx model 14 is hollow and therefore forms an inner passage 31 that extends from one end of the model to the other. Therefore, the larynx model 14 defines a first or proximal opening 33 (FIG. 3) and a second or distal opening 35 (FIG. 2). As can be appreciated from the seam 32 illustrated in FIGS. 2 and 3, the larynx model 14 can be formed from two separate portions, such as opposed halves. Such an embodiment is illustrated in FIG. 4.

Figure 4:
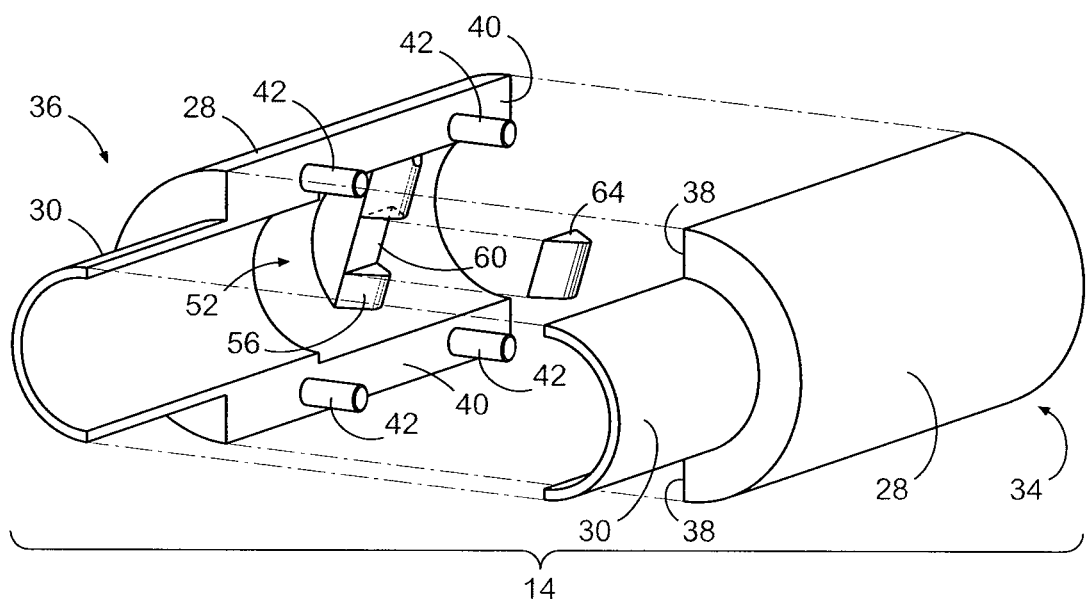
FIG. 4 is an exploded perspective view of the larynx model of FIGS. 1 and 2, illustrating opposed halves of the model and a vocal fold model that can be used with the larynx model.

Referring next to FIG. 4, the illustrated larynx model 14 comprises a first or left model half 34 and a second or right model half 36. As is apparent from FIG. 4, each model half 34, 36 forms part (i.e., half) of the proximal portion 28 and the distal portion 30. Each model half 34, 36 can be unitarily formed from a common material, such as a polymeric material. By way of example, the model halves 34, 36 are formed from or as single pieces of polyvinyl chloride (PVC). With further reference to FIG. 4, each model half 34, 36 comprises substantially planar mating surfaces 38, 40 at which the two halves connect. Extending perpendicularly outward from the mating surface 40 of the right model half 36 are mounting posts 42 that are adapted for receipt within openings 44 formed in the mating surface 38 of the left model half 34 (see FIG. 6). The posts 42 assist in aligning the two model halves 34, 36 and securing the two model halves together.

Figure 5:
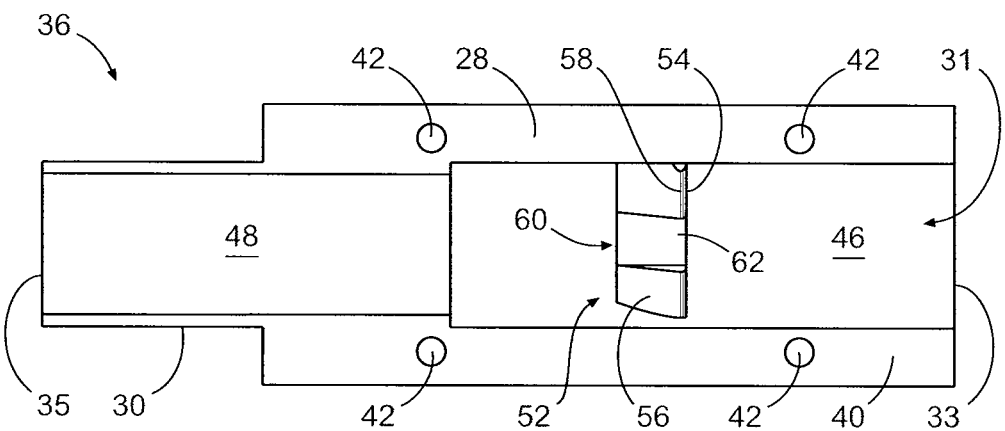
FIG. 5 is a side view of a first half of the larynx model of FIGS. 2-4.
Figure 6:
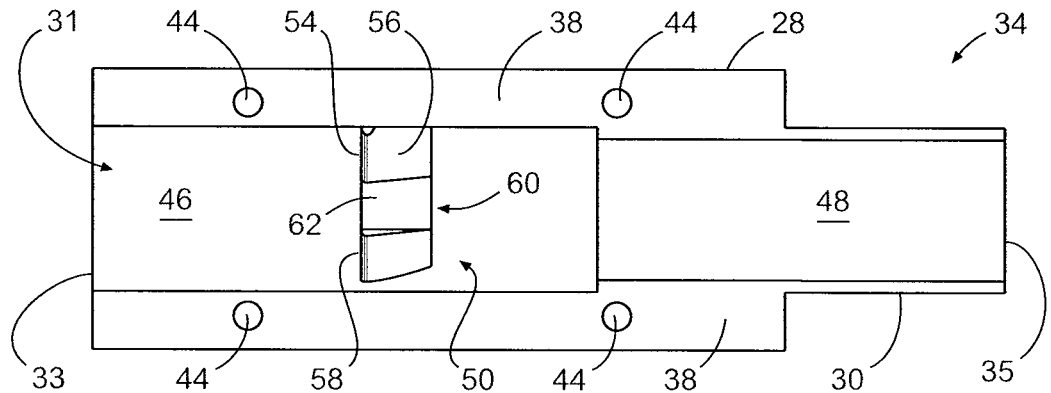
FIG. 6 is a side view of a second half of the larynx model of FIGS. 2-4.

With reference to FIGS. 4-6, the inner passage 31 is generally cylindrical. In the illustrated embodiment, the inner passage 31 comprises two sections, a first or proximal section 46 and a second or distal section 48. Notably, the proximal and distal sections 46 and 48 may not align with or coincide with the proximal and distal portions 28 and 30. At least the proximal section 46 emulates the larynx of a patient and therefore has dimensions of a typical larynx. By way of example, the proximal section 46 and the distal section 48 has a diameter of approximately 1 to 2 inches.

With continued reference to FIGS. 4-6, provided on the walls of the proximal section 46 of each model half 34, 36 are vocal fold model supports 50 and 52 that are adapted to support vocal fold models described below. As is apparent from FIGS. 5 and 6, the vocal fold model supports 50, 52 are mirror images of each other. In addition to supporting the vocal fold models, the vocal fold model supports 50, 52 emulate portions of the human vocal folds. In particular, the vocal fold model supports 50, 52 emulate the general size, shape, and orientation of top and bottom portions of the vocal folds. The vocal fold model supports 50, 52 are therefore formed as protrusions that extend into the inner passage 31.

In some embodiments, the vocal fold model supports 50, 52 each comprise a generally planar proximal surface 54 that is substantially perpendicular to the longitudinal axis of the larynx model 14 and the inner passage 31, and a generally planar distal surface 56 that forms an angle with the proximal surface. The proximal and distal surfaces 54, 56 together form rounded edges 58 that emulate the inner edges of actual vocal folds. With particular reference to FIG. 4, it can be appreciated that the edges 58 are angled relative to the mating surfaces 38, 40 such that the edges extend away from a point adjacent the top of the inner passage 31 at which they are connected to each other. As is apparent from FIG. 14 described below, such an angled orientation replicates the inverted "V" shape of actual vocal folds when viewed during a microlaryngeal procedure. With reference to FIGS. 4-6, each vocal fold model support 50, 52 comprises a void or notch 60 that is adapted to receive a vocal fold model. In some embodiments, the notch 60 is centrally formed in each vocal fold model support 50, 52 about halfway along its edge 58 and comprises a generally planar attachment surface 62. FIG. 4 illustrates an example of a vocal fold model 64 prepared for insertion into one of the notches 60.

Figure 7:
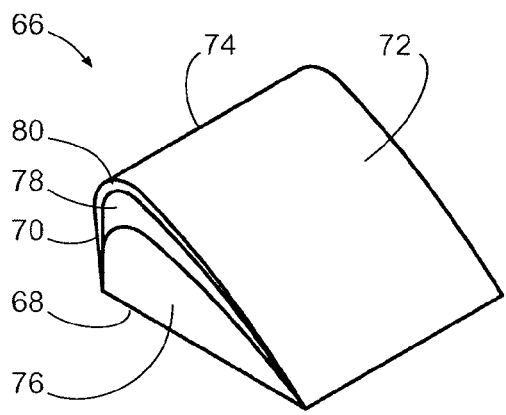
FIG. 7 is a first embodiment of a vocal fold model that can be used with the larynx model of FIGS. 2-6.
Figure 8:
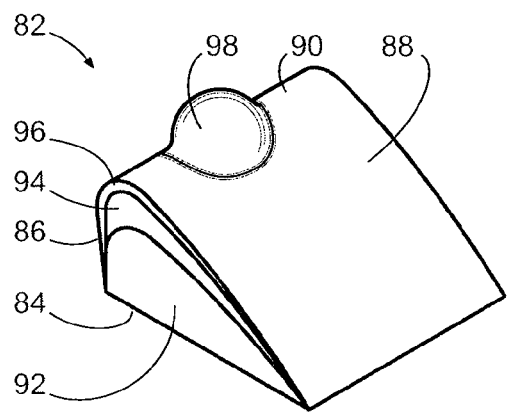
FIG. 8 is a second embodiment of a vocal fold model that can be used with the larynx model of FIGS. 2-6.
Figure 9:
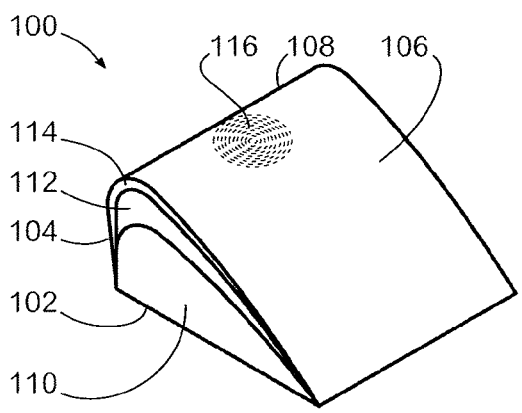
FIG. 9 is a third embodiment of a vocal fold model that can be used with the larynx model of FIGS. 2-6.

FIGS. 7-9 illustrate example disposable vocal fold models or inserts that can be used with the larynx model 14. Beginning with FIG. 7, illustrated is a vocal fold model 66 that represents the tissue of a healthy vocal fold. As shown in FIG. 7, the vocal fold model 66 is generally wedge shaped and comprises a generally planar base 68, a generally planar proximal surface 70, and a generally planar distal surface 72. As with the vocal fold model supports 50, 52, the distal surface 72 is angled relative to the proximal surface 70 and the proximal surface and the distal surface together form a rounded edge 74. As is further shown in FIG. 7, the vocal fold model 66 comprises multiple layers, including a first or inner layer 76 that represents the muscle layer of an actual vocal fold, a second or middle layer 78 that represents the lamina propria of the vocal fold, and a third or outer layer 80 that represents the skin of the vocal fold. In some embodiments, the layers 76-80 of the vocal fold model 66 are formed of different compositions of materials that emulate the physical characteristics of the various vocal fold layers that they represent. For example, the inner layer 76 (muscle) is relatively firm and tough, the middle layer 78 (lamina propria) is gelatinous and soft, and the outer layer (skin) is tough yet pliable and can be torn.

Figure 10:
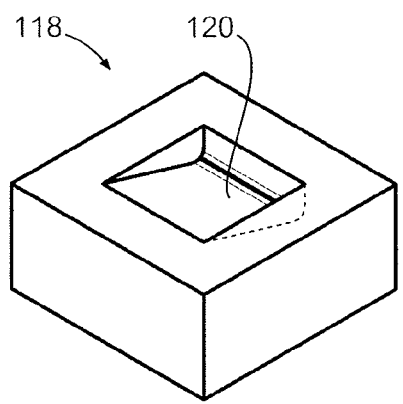
FIG. 10 is a perspective view of an embodiment of a mold that can be used to construct the vocal fold models of FIGS. 7-9.
Figure 11:
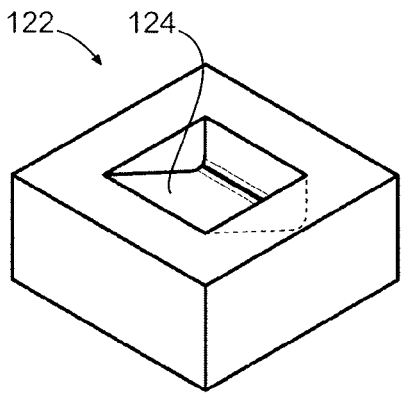
FIG. 11 is a perspective view of embodiment of mold that can be used to construct the vocal fold models of FIGS. 7 and 9.

The layers 76-80 can be formed using a molding process. FIGS. 10 and 11 illustrate molds, which may be constructed of a metal such as aluminum, that can be used in such a process. Beginning with FIG. 10, illustrated is a inner layer mold 118 that is used to form the inner layer 76. The mold 118 includes a relatively shallow depression 120 having the shape and dimensions of the inner layer 76. A first polymer solution can be prepared, poured into the depression 120, and the solution can be cured, for example using ultraviolet (UV) radiation. By way of example, the first polymer solution can comprise approximately 75% poly (ethylene glycol) phenylether acrylate (PEGPEA), 24.5% poly (ethylene glycol) dimethacrylate (PEGDMA), and approximately 0.5% 2,2-dimethoxy-2-phenyl acetophenone (DMPA).

Once the inner layer 76 has been formed, the middle layer 78 can be formed. To that end, a second polymer solution is prepared and poured into a middle layer mold 122 shown in FIG. 11. By way of example, the second polymer solution comprises approximately 99.5% PEGPEA and 0.5% DMPA. As indicated in FIG. 11, the middle layer mold 122 comprises a relatively deep depression 124 that has the shape and dimensions of the middle layer 78 and the inner layer 76 in combination. Therefore, the depression 124 can be partially filled with the second polymer solution and the already formed inner layer 76 can be embedded into the solution (and therefore disposed within the depression). The second polymer solution can then be cured, again using UV radiation, resulting in a two-layer construct.

At this point, the outer layer 80 can be applied to the formed middle layer 78. In some embodiments, a third polymer solution is poured over the middle layer 78 and cured in an oven at approximately 150° C. By way of example, the third polymer solution comprises polydimethylsiloxane (PDMA).

The completed vocal fold model 66 is sized and configured for insertion into the notch 60 described above. Preferably, at least the proximal surface 70 aligns with (e.g., is flush with) the proximal surface 54 of the vocal fold model support 50, 52 and the rounded edge 74 aligns with (e.g., is flush with) the rounded edge 58 of the vocal fold model support. In some embodiments, such a result is achieved using a vocal fold model 66 that is approximately 12 millimeters (mm) long, approximately 8 mm wide, and approximately 5 mm tall. By way of example, the inner layer 76 is approximately 2.5 mm tall, the middle layer 78 is approximately 2 mm thick, and the outer layer 80 is approximately 0.5 mm thick at its thickest point. In some embodiments, the inner layer 76 has a Young's modulus of approximately 0.01602 megaPascals (MPa) and the middle layer 78 has a Young's modulus of approximately 0.009612 MPa, which are similar to the approximately 0.012 MPa Young's modulus of actual vocal folds.

Referring next to FIG. 8, illustrated is a vocal fold model 82 that represents a vocal fold that includes a polyp. As is apparent from FIG. 8, the vocal fold model 82 is similar in many ways to the vocal fold model 66. Therefore, the vocal fold model 82 is generally wedge shaped and comprises a generally planar base 84, a generally planar proximal surface 86, and a generally planar distal surface 88. The distal surface 88 is angled relative to the proximal surface 86, and the proximal surface and the distal surface together form a rounded edge 90. As is further shown in FIG. 8, the vocal fold model 82 also comprises a first or inner layer 92 that represents the muscle layer of an actual vocal fold, a second or middle layer 94 that represents the lamina propria of the vocal fold, and a third or outer layer 96 that represents the skin of the vocal fold. Unlike the "healthy" vocal fold model 66, however, the vocal fold model 82 includes a bulbous nodule 98 that lies beneath the outer layer 96 and is contiguous with the material of the middle layer 94.

Figure 12:
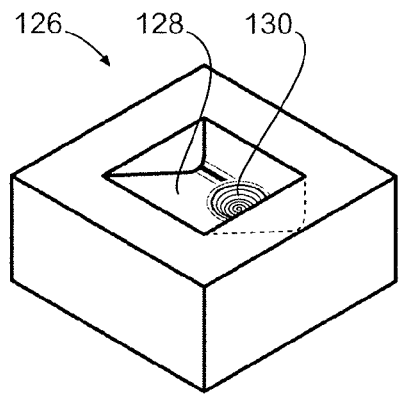
FIG. 12 is a perspective view of an embodiment of mold that can be used to construct the vocal fold model of FIG. 8.

The vocal fold model 82 can be formed using a molding process similar to that described above in relation to vocal fold model 66. However, instead of using the middle layer mold 122 to form the middle layer 94, an alternative middle layer mold 126 shown in FIG. 12 is used. As is apparent from FIG. 12, like mold 122, the mold 126 comprises a relatively deep depression 128 that forms the body of the model 82. However, a further depression 130 is formed in the depression 128 that is used to form the bulbous nodule 98. In some embodiments, the depression 130, and therefore the nodule 98, is generally semispherical and has a diameter of approximately 3 to 4 mm.

Turning to FIG. 9, illustrated is a vocal fold model 100 that represents a vocal fold that includes a cyst. Like the vocal fold model 82, the vocal fold model 100 is similar in many ways to the vocal fold model 66. Therefore, the vocal fold model 100 is generally wedge shaped and comprises a generally planar base 102, a generally planar proximal surface 104, and a generally planar distal surface 106. The distal surface 106 is angled relative to the proximal surface 104, and the proximal surface and the distal surface together form a rounded edge 108. As is further shown in FIG. 9, the vocal fold model 100 also comprises a first or inner layer 110 that represents the muscle layer of a vocal fold, a second or middle layer 112 that represents the lamina propria of a vocal fold, and a third or outer layer 114 that represents the skin of a vocal fold. Unlike the "healthy" vocal fold model 66, however, the vocal fold model 82 includes a nodule 116 that lies within the middle layer 112 beneath the outer layer 96 to represent a cyst.

The vocal fold model 100 can be formed using a molding process similar to that described above in relation to vocal fold model 66. However, when forming the vocal fold model 100, the nodule 116 is separately formed and embedded within the middle layer 112 underneath the inner layer 110 prior to curing of the middle layer. By way of example, the nodule 116 can be made of the same material as the middle layer 112 but can have a different color. For instance, the middle layer 112 can be clear while the nodule 116 can contain a dye that makes the nodule readily identifiable. In some embodiments, the nodule 116 is spherical and has a diameter of approximately 3 to 4 mm.

Figure 13:
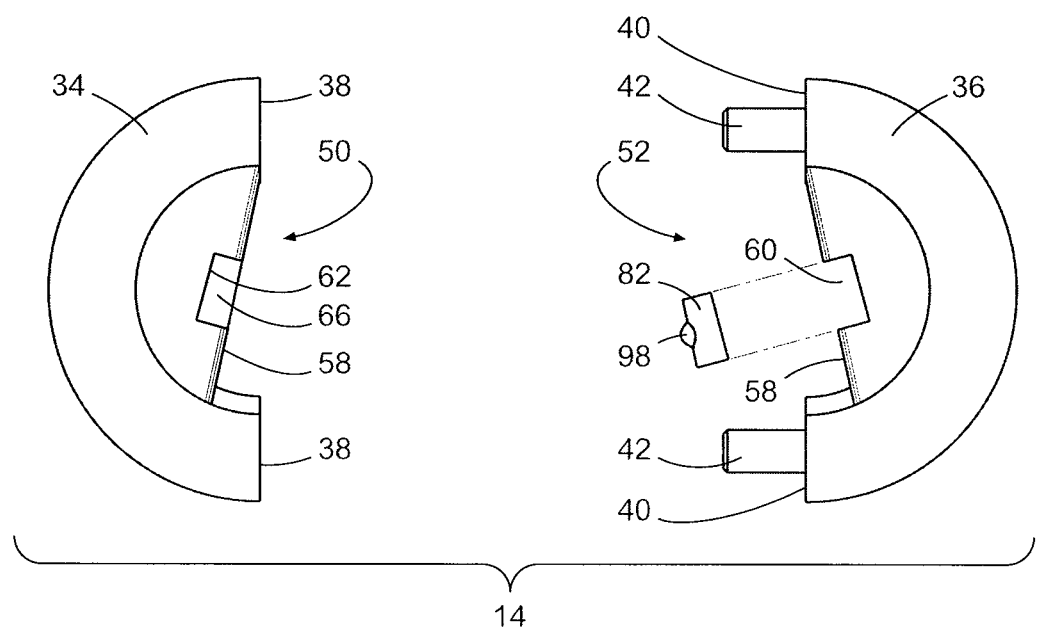
FIG. 13 is an exploded end view of the larynx model of FIGS. 2-4 shown with two vocal fold models.
Figure 14:
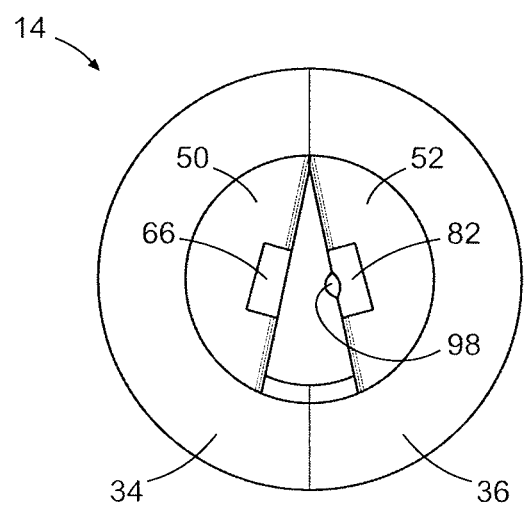
FIG. 14 is an end view of the larynx model of FIGS. 2-4 as assembled with the two vocal fold models from FIG. 13 attached to the larynx model.

Once vocal fold models have been formed, regardless of their particular configuration, they can be used with the larynx model 14 to simulate microlargyeal surgery. With reference to FIG. 13, a first vocal fold model 66 has been inserted into the notch 60 of the left model half 34. By way of example, the vocal fold model 66 can be held in that position using double-sided tape or suitable adhesive that has been applied to the attachment surface 62 of the notch 60. As is further depicted in FIG. 13, a further vocal fold model 82 is prepared for insertion into the notch 60 of the right model half 36. Once both vocal fold models 66, 82 have been inserted into their respective notches 60, the two halves 34, 36 of the larynx model 14 can be joined as indicated in FIG. 14. After the halves 34, 36 have been so joined, the vocal fold model supports 50, 52, together with their vocal fold models 66, 82, form the inverted "V" shape of human vocal folds.

At this point, a surgeon may practice microlaryngeal surgery by "operating" on one or both of the vocal fold models 66, 82. For example, the surgeon may look through the opening 33 and into inner passage 31 of the larynx model 14 using a tube and support stand such as those shown in FIG. 1, to identify the "polyp" represented by nodule 98. The surgeon can then cut through the top layer 96 of the vocal fold model 82 representing the skin, excise the nodule 98 representing the polyp, and replace the top layer over the middle layer 94. The vocal fold model 82 can then be removed from the larynx model 14 and replaced by a new vocal fold model to enable the surgeon to re-practice the procedure, if desired. Because the various layers of the vocal fold models have physical characteristics similar to the layers of an actual vocal fold, the surgeon is provided with a realistic experience similar to that he or she would experience in an actual microlaryngeal procedure. Therefore, the surgeon can get a good "feel" for the surgical procedure without the need for a cadaveric larynx. Given that the surgeon can practice a given procedure multiple times using fresh vocal fold models, the surgeon can spend many hours developing his or her technique before performing an actual surgery on a living patient.

We claim:

1. Apparatus for simulating microlaryngeal surgery, the apparatus comprising:
    a larynx model that emulates an actual larynx, the larynx model including an inner passage that includes a vocal fold model support that emulates a portion of an actual vocal fold; and
    a vocal fold model that emulates tissues of an actual vocal fold, the vocal fold model being adapted to be received by the vocal fold model support of the larynx model.

2. The apparatus of claim 1, wherein the inner passage is generally cylindrical.

3. The apparatus of claim 1, wherein the vocal fold model support comprises a protrusion that extends into the inner passage from an inner wall of the larynx model.

4. The apparatus of claim 1, wherein the vocal fold model support emulates top and bottom portions of an actual vocal fold.

5. The apparatus of claim 1, wherein the vocal fold model support comprises a rounded edge.

6. The apparatus of claim 5, wherein the rounded edge has an angled orientation.

7. The apparatus of claim 6, wherein the rounded edge extends at an outward angle down from a top portion of the inner passage.

8. The apparatus of claim 5, wherein the rounded edge is formed by a proximal surface and a distal surface of the vocal fold model support.

9. The apparatus of claim 8, wherein the distal surface forms an angle with the proximal surface.

10. The apparatus of claim 1, wherein the vocal fold model support comprises a notch that is adapted to receive the vocal fold model.

11. The apparatus of claim 10, wherein the notch is located at a center of the vocal fold model support.

12. The apparatus of claim 1, wherein the larynx model comprises a cylindrical tube.

13. The apparatus of claim 12, wherein the tube is formed from opposed halves.

14. The apparatus of claim 13, wherein each larynx model half comprises a vocal fold model support.

15. The apparatus of claim 14, wherein the vocal fold model supports are joined adjacent two joined mating surfaces of the larynx model and wherein the vocal fold model supports extend downward from the mating surfaces at an angle away from each other so as to form an inverted "V" shape.

16. The apparatus of claim 1, wherein the vocal fold model is generally wedge shaped.

17. The apparatus of claim 1, wherein the vocal fold model comprises multiple layers.

18. The apparatus of claim 1, wherein the vocal fold model comprises an inner layer representing muscle, a middle layer representing the lamina propria, and an outer layer representing skin.

19. The apparatus of claim 18, wherein the inner layer is relatively firm, the middle layer is relatively gelatinous and soft, and the outer layer is relatively tough yet pliable.

20. The apparatus of claim 18, wherein each layer is formed from a different polymeric material.

21. The apparatus of claim 1, further comprising a support stand adapted to support the larynx model in a desired orientation.

22. A larynx model for use in performing simulated microlaryngeal surgery, the apparatus comprising:
a generally cylindrical tube having proximal and distal ends, the cylindrical tube including an inner passage defined by inner walls that extends from the proximal end to the distal end, the tube being formed from two opposing halves that can be separated to provide access to the inner passage; and
opposed vocal fold model supports that protrude from the inner walls into the inner passage and that emulate actual vocal folds, the vocal fold model supports extending downward at an outward angle from a top portion of the inner passage and away from each other so as to form an inverted "V" shape visible when one looks at the vocal fold models from the proximal end of the tube, the vocal fold model supports each comprising a notch that is adapted to receive a vocal fold model that emulates tissues of an actual vocal fold.

23. The larynx model of claim 22, wherein the vocal fold model supports each comprise a proximal surface and a distal surface that together form a rounded edge.

24. The larynx model of claim 23, wherein the distal surface forms an angle with the proximal surface.

25. The larynx model of claim 22, wherein the notch is located at a center of the vocal fold model support.

26. A disposable vocal fold model that emulates an actual vocal fold comprising:
a wedge-shaped body defined by a base, a proximal surface, and a distal surface, the distal surface being angled relative to the proximal surface and forming a rounded edge with the proximal surface, the body including an inner layer representing muscle of the vocal fold, a middle layer representing the lamina propria of the vocal fold, and an outer layer representing skin of the vocal fold, each layer having different physical characteristics that emulate the physical characteristics of the actual vocal fold layers they represent.

27. The vocal fold model of claim 26, wherein each layer is formed from a different composition of material.

28. The vocal fold model of claim 26, wherein the inner layer is relatively firm, the middle layer is relatively gelatinous and soft, and the outer layer is relatively tough yet pliable.

29. The vocal fold model of claim 26, further comprising a bulbous nodule that extends from the body to represent a polyp.

30. The vocal fold model of claim 29, wherein the bulbous nodule is contiguous with the middle layer and is covered by the outer layer.

31. The vocal fold model of claim 26, further comprising a nodule provided within the middle layer that represents a cyst.

32. The vocal fold model of claim 31, wherein the nodule has a color different from a color of the middle layer.

\* \* \* \* \*